United States Patent
Vincent et al.

(10) Patent No.: US 10,233,550 B2
(45) Date of Patent: Mar. 19, 2019

(54) POROUS ELECTRODE FOR PROTON-EXCHANGE MEMBRANE

(71) Applicant: Commissariat à l'énergie atomique et aux énergies alternatives, Paris (FR)

(72) Inventors: Rémi Vincent, Grenoble (FR); Eric Mayousse, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 189 days.

(21) Appl. No.: 15/333,322

(22) Filed: Oct. 25, 2016

(65) Prior Publication Data

US 2017/0044678 A1 Feb. 16, 2017

Related U.S. Application Data

(62) Division of application No. 14/370,921, filed as application No. PCT/EP2013/050127 on Jan. 4, 2013, now abandoned.

(30) Foreign Application Priority Data

Jan. 6, 2012 (FR) ...................................... 12 50163

(51) Int. Cl.
*C25B 9/08* (2006.01)
*C25B 11/00* (2006.01)
(Continued)

(52) U.S. Cl.
CPC ............... *C25B 9/08* (2013.01); *C09D 11/52* (2013.01); *C25B 1/10* (2013.01); *C25B 11/00* (2013.01); *C25B 11/035* (2013.01); *C25B 11/04* (2013.01); *C25B 11/0405* (2013.01); *C25B 11/0489* (2013.01); *H01M 4/8605* (2013.01); *H01M 4/8668* (2013.01); *H01M 4/8814* (2013.01);
(Continued)

(58) Field of Classification Search
None
See application file for complete search history.

(56) References Cited

U.S. PATENT DOCUMENTS 4,804,592 A * 2/1989 Vanderborgh .......... C25B 11/00
204/283
5,211,984 A * 5/1993 Wilson .................. H01M 4/926
427/115
(Continued)

FOREIGN PATENT DOCUMENTS

DE 102004003150 8/2005
WO 2002/070290 9/2002
(Continued)

*Primary Examiner* — Harry D Wilkins, III
(74) *Attorney, Agent, or Firm* — Occhiuti & Rohlicek LLP

(57) ABSTRACT

A process for manufacturing a catalytic electrode includes depositing an electrocatalytic ink on a carrier, wherein the electrocatalytic ink includes an electrocatalytic material and a product polymerizable into a protonically conductive polymer. The process also includes solidifying the electrocatalytic ink so as to form an electrode wherein the composition of the product polymerizable into a protonically conductive polymer and its proportion in the ink is defined so that the electrode formed has a breaking strength greater than 1 MPa. The process further includes separating the electrode formed from the carrier.

10 Claims, 1 Drawing Sheet

(51) Int. Cl.
*H01M 4/88* (2006.01)
*H01M 4/86* (2006.01)
*C25B 11/03* (2006.01)
*C25B 11/04* (2006.01)
*C09D 11/52* (2014.01)
*C25B 1/10* (2006.01)
*H01M 8/1018* (2016.01)
*H01M 8/0656* (2016.01)

(52) U.S. Cl.
CPC ........ *H01M 4/8828* (2013.01); *H01M 8/0656* (2013.01); *H01M 2008/1095* (2013.01); *H01M 2250/20* (2013.01); *Y02E 60/366* (2013.01); *Y02T 90/32* (2013.01); *Y10T 29/49115* (2015.01); *Y10T 29/49117* (2015.01)

(56) References Cited

U.S. PATENT DOCUMENTS

| | | | | |
|---|---|---|---|---|
| 5,470,448 A * | 11/1995 | Molter | ............. | C25B 9/10 204/252 |
| 6,066,248 A * | 5/2000 | Lyke | ............. | C25B 1/26 205/620 |
| 6,152,468 A | 11/2000 | Glaeser et al. | | |
| 6,524,736 B1 * | 2/2003 | Sompalli | ............. | C25B 9/10 427/115 |
| 6,723,464 B2 * | 4/2004 | Tabata | ............. | H01M 4/8605 427/115 |
| 6,916,573 B2 * | 7/2005 | Trabold | ............. | H01M 4/8605 429/483 |
| 7,141,270 B2 * | 11/2006 | Wittpahl | ............. | H01M 8/1004 427/115 |
| 7,341,654 B2 * | 3/2008 | Twardowski | ............. | C25B 1/24 205/618 |
| 8,168,025 B2 * | 5/2012 | Mah | ............. | B32B 37/025 156/230 |
| 8,338,059 B2 * | 12/2012 | Lee | ............. | H01M 4/8605 29/746 |
| 8,641,878 B2 * | 2/2014 | Nemes | ............. | G01N 27/4045 204/418 |
| 2005/0072514 A1 * | 4/2005 | Yan | ............. | H01M 4/881 156/230 |
| 2008/0187813 A1 * | 8/2008 | Ye | ............. | H01M 4/8636 429/465 |
| 2008/0296433 A1 | 12/2008 | Brenner et al. | | |
| 2010/0248077 A1 * | 9/2010 | Matsumi | ............. | H01M 4/8807 429/492 |
| 2011/0200896 A1 * | 8/2011 | Hasegawa | ............. | H01M 8/04104 429/414 |
| 2011/0294037 A1 * | 12/2011 | Ji | ............. | H01M 4/881 429/483 |
| 2014/0287344 A1 * | 9/2014 | Suzue | ............. | H01M 4/86 429/483 |

FOREIGN PATENT DOCUMENTS

| | | |
|---|---|---|
| WO | 2008/076006 | 6/2008 |
| WO | 2009/065228 | 5/2009 |

* cited by examiner

POROUS ELECTRODE FOR PROTON-EXCHANGE MEMBRANE

RELATED APPLICATIONS

Under 35 USC 120, this application is a divisional application of U.S. application Ser. No. 14/370,921 filed Jul. 7, 2014, which is the U.S. national stage under 35 USC 371 of international application PCT/EP2013/050127 filed Jan. 4, 2013, which claims the benefit of the Jan. 6, 2012 priority date of French application FR1250163.

FIELD OF INVENTION

The invention relates to the production of gas by electrolysis, and in particular to devices for producing hydrogen using a proton-exchange membrane in order to achieve low-temperature electrolysis of water.

BACKGROUND

Fuel cells are envisioned as systems for supplying electrical power to mass-produced automotive vehicles in the future, and for many other applications. A fuel cell is an electrochemical device that converts chemical energy directly into electrical energy. Dihydrogen is used as fuel in fuel cells. The dihydrogen is oxidized on an electrode of the cell and dioxygen from the air is reduced on another electrode of the cell. The chemical reaction produces water. The great advantage of fuel cells is that they do not emit atmospheric pollutants at the point where the electricity is generated.

One of the major difficulties facing the development of such fuel cells lies in the synthesis and supply of dihydrogen. On earth, hydrogen exists in large amounts only combined with oxygen (in the form of water), with sulfur (hydrogen sulfide), with nitrogen (ammonia) or with carbon (fossil fuels such as natural gas or crude oils). Therefore, the production of dihydrogen either requires fossil fuels to be consumed, or substantial amounts of cheap energy to be available in order to obtain it via thermal or electrochemical decomposition of water.

The most common process for producing hydrogen from water thus consists in applying the principle of electrolysis. To carry out such processes, electrolyzers equipped with a proton-exchange membrane (PEM) are known. In such electrolyzers, an anode and a cathode are fixed on either side of the proton-exchange membrane (to form a membrane/electrodes assembly) and brought into contact with water. A potential difference is applied between the anode and the cathode. Thus, oxygen is produced at the anode by oxidation of the water. The oxidation at the anode also generates $H^+$ ions that pass through the proton-exchange membrane to the cathode, electrons being supplied to the cathode by the electrical power supply. At the cathode, the $H^+$ ions are reduced to generate dihydrogen.

In practice, such an electrolyzer generally comprises supply plates placed on either side of the membrane/electrodes assembly. Current collectors are placed between the supply plates and the membrane/electrodes assembly.

Such an electrolysis device is subject to undesirable effects. An issue for such a proton-exchange membrane electrolyzer is to increase its efficiency and its lifetime, to decrease its manufacturing cost and to guarantee a high level of safety. These parameters are highly dependent on the manufacturing process of the electrodes.

In a first type of process for manufacturing an electrode, catalytic ink is deposited in a layer on the current collectors. On the anode side, high overvoltages are required for electrooxidation of water. Thus, the anodic potential of the electrolyzer is in general very high (>1.6 VSHE). The use of carbon-containing materials and especially of diffusing layers made of carbon (felt, paper, carbon fabrics) is thus impossible (corrosion into $CO_2$), whereas such materials are widely used on the cathode side. The current collectors on the anode side generally take the form of sintered parts made of porous titanium or of titanium meshes.

Depositing the electrocatalytic ink on such collectors has the major drawback of decreasing their porosity to water, thus limiting the transport of water to the catalyst. In addition, some of the catalyst material does not participate in the catalytic reaction (and therefore the amount thereof is unnecessarily large) because it is located in pores in the current collector. Also, the electrode/membrane interface is relatively poor because the effective surface area of the electrode is small. Thus, the performance of the electrolyzer is somewhat limited. Furthermore, locating the catalyst material in the pores of the current collector makes recycling the catalyst difficult. This is because it is particularly difficult to separate noble metals from the electrodes and current collectors. Moreover, such current collectors generally require precise and expensive machining operations to produce.

To solve certain of these drawbacks, a second type of manufacturing process involves depositing the electrocatalytic ink directly onto the proton-exchange membrane, so as to form a layer forming an electrode.

In such a process, the membrane absorbs moisture during deposition of the ink and thus swells and deforms. Next, contraction during drying also causes deformation. These deformations are not negligible and generate mechanical stresses in deposits, which may lead to cracks on the formed electroactive layer. Such cracks decrease the electronic percolation of the electrode and thus decrease its electrical conductivity. In addition, the cracks may decrease cohesion between the electrode and the membrane. Moreover, in operation, the membrane is completely submerged in water, maximizing its degree of swelling. The mechanical stresses at the interface between the electrode and the membrane are thus maximized, inducing additional deterioration of the electrode. This deterioration of the electrode decreases the energy efficiency of the electrolyzer and its lifetime.

Another problem with forming an electrode by catalytic deposition on the membrane is the damage caused to this membrane by solvents present in the ink (ethanol or isopropanol for example). On the one hand, the solvents increase the permeability of the membrane to gases. Some of the gases produced at the anode and at the cathode thus diffuse through the proton-exchange membrane. Not only does this cause problems with the purity of the gases produced, but it also causes safety problems. Specifically, the proportion of hydrogen in the oxygen must absolutely not exceed 4%, such a proportion being the lower explosive limit of hydrogen in oxygen. On the other hand, damage of the membrane by the solvents decreases its lifetime.

SUMMARY

In one aspect, the invention features an electrochemical cell having an electrode inserted between a proton-exchange membrane and a current collector. The electrode includes a protonically conductive polymer and an electrocatalytic material. The electrode has a breaking strength that is greater than 1 MPa, and an area of which at least 95% mechanically bonded to neither the conductive current collector nor the proton-exchange membraneproton-exchange membrane.

In some embodiments, the electrode comprises methylcellulose that is in a proportion by weight of between 2 and 10.5%.

These and other features of the invention will be apparent from the following detailed description and the accompanying figures, in which:

DETAILED DESCRIPTION

Figure 1:
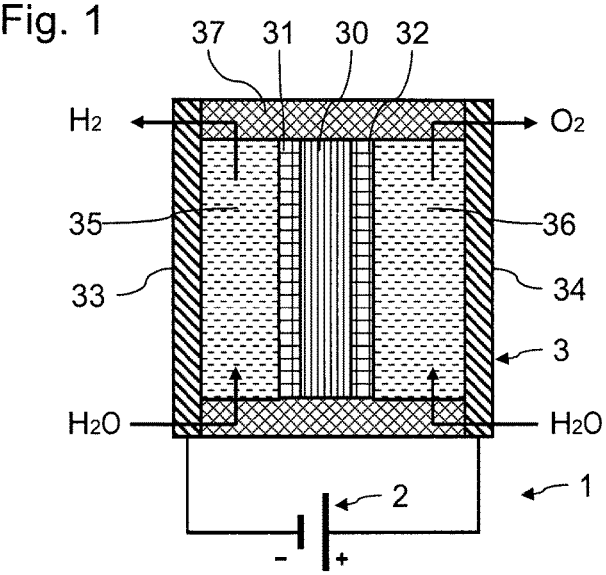
FIG. 1 is a schematic sectional view of an example electrolysis device according to the invention.

FIG. 1 is a schematic sectional view of an example electrolysis device 1 comprising two electrodes. The electrolysis device 1 is equipped with a proton-exchange membrane 30. An anode 32 and a cathode 31 are fixed on either side of the proton-exchange membrane 30. The electrolysis device 1 furthermore comprises first and second porous current-collectors 35, 36 making contact with the cathode 31 and the anode 32, respectively. The electrolysis device 1 also comprises first and second electrical-supply plates 33, 34 making contact with the first and second porous current-collectors 35, 36, respectively. The first porous current-collector 35 is thus interposed between the first supply-plate 33 and the cathode 31. The second porous current-collector 36 is interposed between the second supply-plate 34 and the anode 32. The electrolysis device 1 is in this case sealed by insulating clamping plates associated with a suitable seal 37.

The first electrical supply plate 33 contains a water supply duct in communication with the cathode 31 via the first porous current-collector 35. The first electrical supply plate 33 also contains a duct, for removing dihydrogen, in communication with the cathode 31 via the first porous current-collector 35.

The second electrical supply plate 34 contains a water supply duct in communication with the anode 32 via the porous current-collector 36. The second electrical supply plate 34 also contains a duct, for removing dioxygen, in communication with the anode 32 via the porous current-collector 36.

The proton-exchange membrane 30 allows protons to be transferred between the anode 32 and the cathode 31 and permits separating the gases generated. The proton-exchange membrane 30 also acts as an electronic insulator between the anode 32 and the cathode 31. The proton-exchange membrane 30 may for example be made of a perfluorosulfonic acid polymer membrane. Such materials are especially distributed under the trade name Nafion by DuPont. Such a membrane frequently is about 100 µm in thickness.

In operation, the anode 32 and the cathode 31 are brought into contact with water. A voltage source 2 applies a potential difference is applied between the anode 32 and the cathode 31. The voltage source 2 is configured to apply a DC voltage of between 1.3 volts and 3.0 volts to cause a current density in the first and second electrical supply plates 33, 34 of between 10 and 40,000 amperes per square meter.

When such a voltage is applied, the following reaction occurs at the anode 32:

$$2H_2O \rightarrow 4H^+ + 4e^- + O_2.$$

An oxidation reaction of the water at the anode 32 produces dioxygen. The oxidation at the anode 32 also generates $H^+$ ions that pass through the proton-exchange membrane 30 to the cathode 31 and electrons are sent back to the cathode 31 by the source 2. At the cathode 31, the $H^+$ ions are reduced to generate dihydrogen.

The reaction at the cathode 31 is thus the following:

$$2H^+ + 2e^- \rightarrow H_2.$$

At least one of the cathode 31 and the anode 32, hereafter referred to generically as an "electrode," is formed of a layer that forms neither a coating secured to the membrane 30, nor a coating secured to the first or second porous current-collectors 35, 36. One or more of the electrodes is thus a mechanically self-supporting layer.

The porosity of the first and second porous current-collector collectors 35, 36 to water is thus preserved. It also optimizes use of the catalyst material of the cathode 31 and the anode 32, thereby improving the performance of the electrolysis device 1. Recycling of the electrolysis device 1 is made easier due to the absence of catalyst in the first and second porous current-collectors 35, 36.

As a result, it possible to avoid any interaction between the membrane 30 and the anode or cathode 31, 32 during the process used to manufacture the anode or cathode 31, 32. Thus, the deformation inherent to wetting and drying of the membrane 30 when an ink is applied thereto is avoided. Cracks of the cathode and anode 31, 32 are thus prevented, and likewise the decreased performance that results therefrom. Degradation of the membrane 30 due to solvents possibly used when forming the cathode and anode 31, 32 is thus also avoided. The impermeability of the membrane 30 to gases is thus improved.

Figure 2:
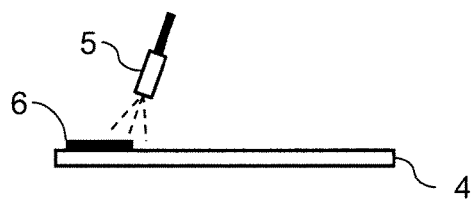
FIGS. 2 to 5 illustrate various steps of an example process for manufacturing an electrode for such an electrolysis device.
Figure 3:
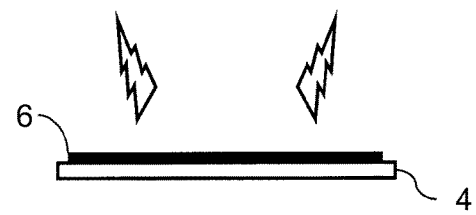
Figure 4:
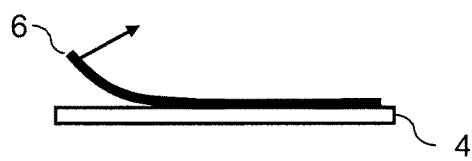

FIGS. 2 to 4 illustrate various steps of an example process for manufacturing a cathode and an anode 31, 32.

A first step, illustrated in FIG. 2, includes depositing liquid electrocatalytic ink 6 on a carrier 4. The ink 6 may be deposited by any appropriate means, for example using a coating technique, or by spraying with a nozzle 5 as illustrated. To produce an electrode with a uniform thickness, it is preferable to deposit the ink 6 on a carrier 4 that is substantially flat and held horizontal.

As detailed below, the electrocatalytic ink 6 and the carrier 4 adhere weakly to each other. This is contrary to the conventional aim of making the ink adhere to a membrane or a current collector.

On the one hand, the electrocatalytic ink 6 comprises a product polymerizable into a protonically-conductive polymer, and on the other hand an electrocatalytic material. The polymerizable product is intended to be solidified, thus giving the electrode mechanical strength while also making it possible for water and ions to diffuse to the electrocatalytic material when the electrode is assembled in the catalysis device 1. The polymerizable product may take the form of a dissolved polymer or of an ionomer.

The electrocatalytic material has catalytic properties matched to the catalytic reaction to be carried out. The electrocatalytic material may take the form of particles or nanoparticles containing metal atoms. The catalyst material may comprise metal oxides. In the formulations mentioned below, the electrocatalytic material is iridium oxide. Metals such as platinum, gold, silver, cobalt, and ruthenium may also be used. The electrocatalytic ink 6 advantageously contains a thickening product, an example of which is methylcellulose. The various components of the electrocatalytic ink 6 are advantageously dissolved in a solvent such as water.

To limit the adhesion between the ink 6 and the carrier 4, it is preferable for the carrier 4 to have a roughness lower than 5 μm, and preferably lower than 3 μm. In an effort to limit adhesion, it is particularly preferable for the carrier 4 to have an interface energy that is lower than 60 millinewtons per meter, and in some cases, even lower than 45 millinewtons per meter.

In some embodiments, the carrier 4 has an interface energy higher than 20 millinewtons per meter and preferably at least equal to 25 millinewtons per meter in order to limit the formation of scattered drops before the ink 6 has solidified.

To limit the adhesion between the ink 6 and the carrier 4, it is particularly desirable for the deposited ink to have a surface tension that is higher than the carrier's interface energy.

A second step, illustrated in FIG. 3, includes solidifying the electrocatalytic ink 6 that has been deposited on the carrier 4. In this step, the polymerizable product reacts to form a polymer. This results in the formation of a film on the electrode is thus formed on the carrier 4. A polymerizable product is an ionomer.

The step of solidifying the electrocatalytic ink may involve a drying step to evaporate the solvent. Any drying process may be used. Examples include drying with an oven or a flow of hot air. In some practices, drying the electrocatalytic ink includes placing it in an environment at a temperature of between 50° and 150° C.

A third step includes separating the electrode formed by the solidified ink 6 from the carrier 4. In some examples, this involves using a force to peel or lift the solidified ink 6 from the carrier 4. Because the solidified ink 6 is not strongly bonded to the carrier 4, this force can be relatively small. This weak adhesion promotes separability of the electrode formed with a minimal risk of deterioration.

To allow the electrode to be handled during its separation from the carrier 4, and to give it mechanical strength during its subsequent use, the composition of the polymerizable product and its proportion in the ink are defined so that the electrode formed has a breaking strength greater than 1 MPa, preferably greater than 5 MPa, and typically comprised between 1 and 15 MPa.

An electrode thus formed will advantageously have a thickness comprised between 2 and 20 μm and preferably between 5 and 10 μm.

Figure 5:
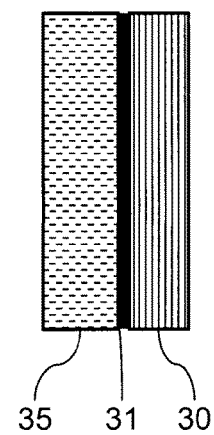

A fourth step, illustrated in FIG. 5, includes integrating an electrode thus formed into an electrochemical cell, here an electrolysis device. Here, the electrode formed is a cathode 31 that is inserted between a proton-exchange membrane 30 and a conductive current collector 35.

Advantageously, any fastening of the middle part of the electrode is avoided in order not to degrade the performance or lifetime thereof. Advantageously, at least 95% of the area of the electrode is not mechanically bonded to the current collector and not mechanically bonded to the membrane. Advantageously, the electrode is held in position by compressing it between the proton-exchange membrane 30 and a current collector. A pressure of between 0.05 and 1.5 MPa will for example be applied to the electrode in order to ensure it is held in position.

Advantageously, the electrocatalytic material includes a thickening product. This thickening product advantageously comprises methylcellulose.

Trials have demonstrated that a proportion of thickening product, and in particular methylcellulose, of between 2 and 10.5% of the solid content of the ink proves to be particularly advantageous to facilitate separation of the solidified ink and the carrier 4. Optimally, this proportion of thickening product is between 3 and 6% and preferably between 4 and 5%.

To ensure the electrode preserves optimal water diffusion properties, the proportion of the polymerizable product in the ink is advantageously defined so that the electrode formed has a porosity of between 20 and 40%. The ink 6 will possibly and advantageously have a proportion of polymerizable product of between 20 and 30% of its solid content.

To facilitate the catalytic effect of the electrode formed, the proportion of electrocatalytic material is advantageously between 60 and 75% of the solid content of the ink.

The following is a first example of a possible formulation for the ink 6:

| Products | % by weight | % by weight (solid content) |
| --- | --- | --- |
| $IrO_2$ | 12.3 | 69.9 |
| Nafion ionomer DE2020 | 4.9 | 27.84 |
| Methylcellulose | 0.4 | 2.26 |
| Water | 82.3 | |

The following is a second example of a possible formulation for the ink 6:

| Products | % by weight | % by weight (solid content) |
| --- | --- | --- |
| $IrO_2$ | 12.3 | 68.33 |
| Nafion ionomer DE2020 | 4.9 | 27.22 |
| Methylcellulose | 0.8 | 4.44 |
| Water | 82.0 | |

The following is a third example of a possible formulation for the ink 6:

| Products | % by weight | % by weight (solid content) |
| --- | --- | --- |
| $IrO_2$ | 12.2 | 64.21 |
| Nafion ionomer DE2020 | 4.8 | 25.26 |
| Methylcellulose | 2.0 | 10.53 |
| Water | 81.0 | |

In the examples given, the various components of the ink are dissolved in water. However, it may also be envisioned to dissolve these components in alcohol or in a mixture of alcohol and water.

In the process for manufacturing the electrode described above, the electrode does not contain reinforcing fibers. Such an absence of reinforcing fibers allows the protonic permeability of the electrode to be improved and the density of incorporated electrocatalytic material to be maximized. However, it may of course be envisioned to include reinforcing fibers in the ink in order to increase its breaking strength properties.

Although the example described illustrates the integration of an electrode into an electrolysis device, the invention of course also applies to the integration of such an electrode into a fuel cell. Such an electrode may then be bonded to a membrane adapted to a fuel cell, for example having a thickness of about 25 μm.

The invention claimed is:

1. A manufacture comprising an electrochemical cell, wherein said electrochemical cell comprises a proton-exchange membrane, a conductive current collector, and an electrode, wherein said electrode is inserted between said proton-exchange membrane and said current collector, wherein said electrode comprises a protonically conductive polymer and an electrocatalytic material, wherein said electrode has a breaking strength that is greater than 1 MPa, and wherein said electrode has an area of which at least 95% is not mechanically bonded to said conductive current collector and not mechanically bonded to said proton-exchange membrane.

2. The manufacture of claim 1, wherein said electrode comprises methylcellulose, wherein said methylcellulose is present in a proportion by weight of between 2 and 10.5%.

3. The manufacture of claim 1, further comprising a carrier, wherein said electrocatalytic material is deposited on said carrier, and wherein said carrier has a roughness lower than five micrometers.

4. The manufacture of claim 1, further comprising an ink that comprises a polymerizable product, wherein said polymerizable product is polymerizable into a protonically conductive polymer, and wherein as a result of a ratio in which said polymerizable product is present, said electrode has a porosity of between 20% and 40%.

5. The manufacture of claim 1, further comprising electrocatalytic ink, wherein said electrocatalytic ink comprises solid content, wherein said solid content comprises said electrocatalytic material, and wherein said electrocatalytic material comprises between 60% and 75% of said solid content by weight.

6. The manufacture of claim 1, wherein said electrochemical cell comprises a polymer that is formed from polymerization of an ink that comprises a polymerizable product, wherein said polymer is a protonically-conductive polymer, and wherein as a result of a ratio in which said polymerizable product is present, said electrode has a porosity of between 20% and 40%.

7. The manufacture of claim 1, wherein said electrode is a first electrode and said conductive current collector is a first conductive current collector, wherein said electrochemical cell further comprises a second electrode and a second conductive collector, wherein said second electrode is inserted between said proton-exchange membrane and said second current collector, wherein said second electrode comprises a protonically-conductive polymer and an electrocatalytic material, wherein said second electrode has a breaking strength that is greater than 1 MPa, and wherein said second electrode has an area of which at least 95% is not mechanically bonded to said second conductive current collector and not mechanically bonded to said proton-exchange membrane.

8. The manufacture of claim 1, wherein said electrode is held in position by being compressed between said proton-exchange membrane and said current collector.

9. The manufacture of claim 1, wherein said electrode, when inserted between said proton-exchange membrane and said current collector, has an area of which at least 95% is not mechanically bonded to said conductive current collector and not mechanically bonded to said proton-exchange membrane.

10. The manufacture of claim 1, wherein said electrode is made out of a polymerized product that forms a protonically-conductive polymer and wherein the polymerized product has an area of which at least 95% is not mechanically bonded to said conductive current collector and not mechanically bonded to said proton-exchange membrane.

* * * * *